UNITED STATES PATENT OFFICE.

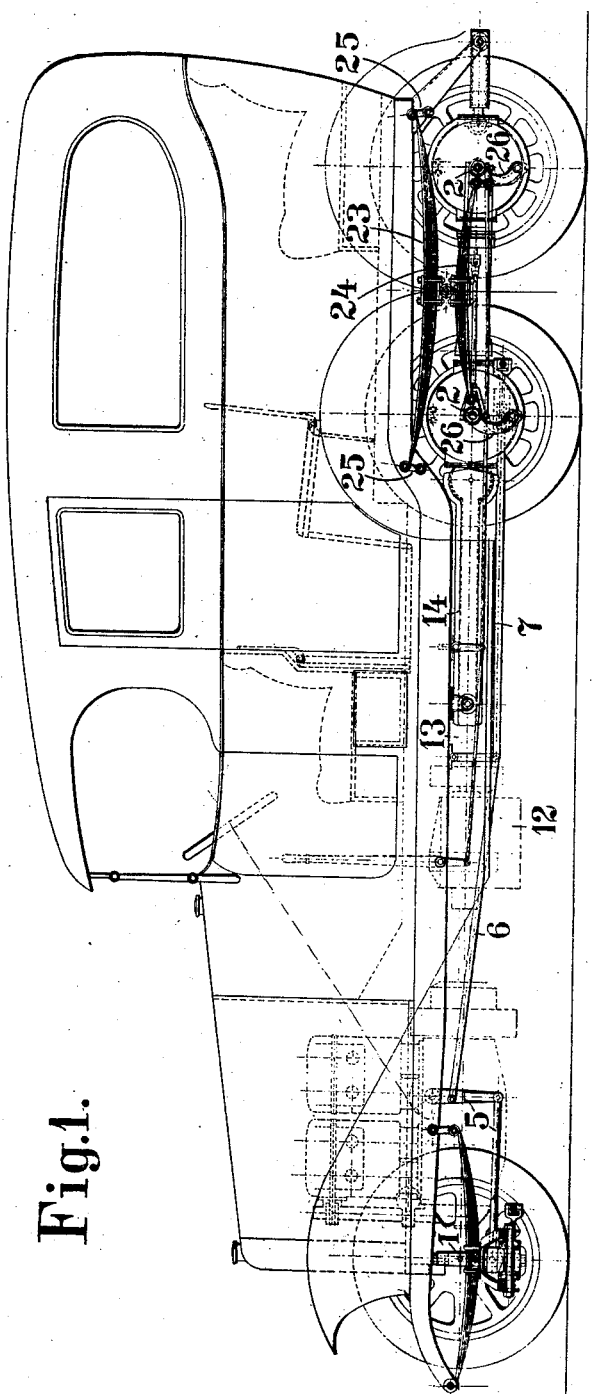

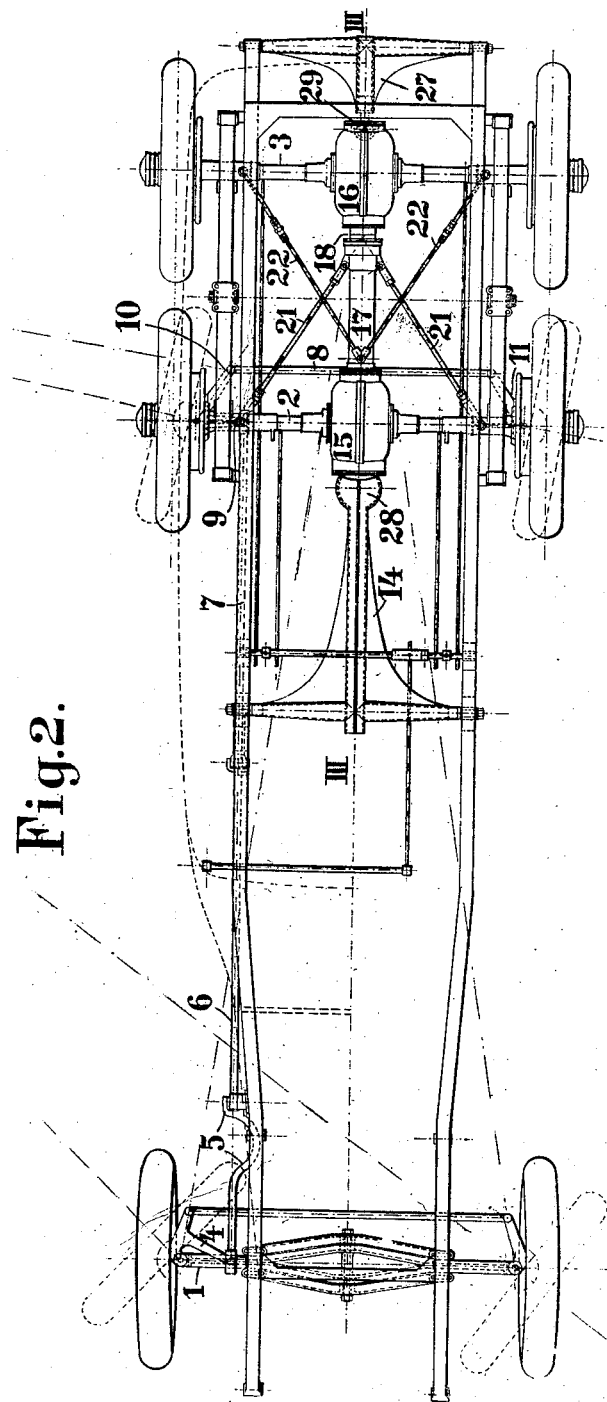

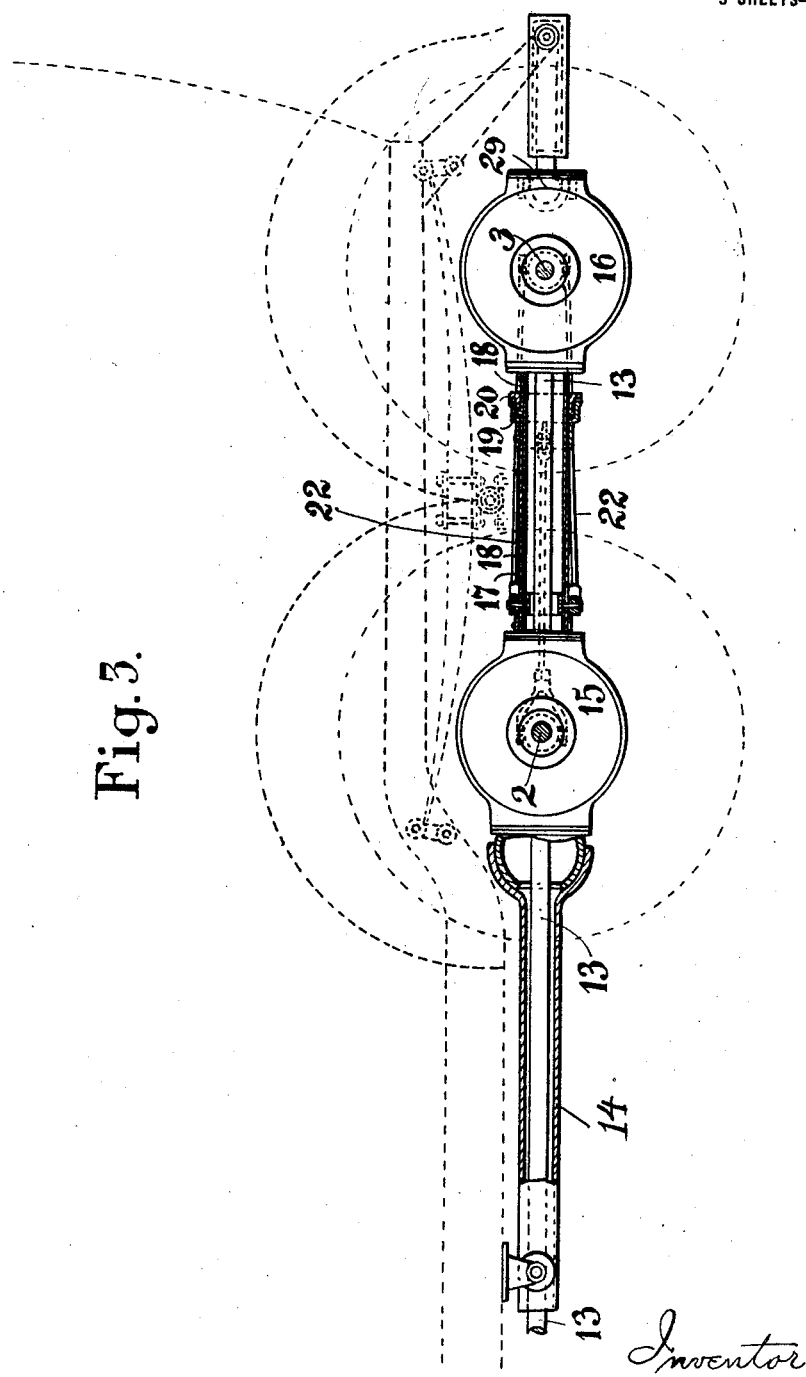

HANS CLARIN HOVIND MUSTAD, OF CHRISTIANIA, NORWAY.

THREE-AXLED CHASSIS FOR MOTOR-DRIVEN VEHICLES.

1,332,949.  Specification of Letters Patent.  Patented Mar. 9, 1920.

Application filed September 15, 1917. Serial No. 191,645.

*To all whom it may concern:*

Be it known that I, HANS CLARIN HOVIND MUSTAD, a subject of the King of Norway, residing at Christiania, in the Kingdom of Norway, have invented certain new and useful Improvements in Three-Axled Chassis for Motor-Driven Vehicles; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention relates to motor driven vehicles and has for its object a frame or chassis resting on three axles and having six wheels; of which the front wheels are connected in the ordinary manner with the steering gear and the rear wheels are driven in the ordinary manner from the motor, while the middle wheels are connected both with the steering gear and the driving mechanism.

By this construction is obtained a stable chassis with a large carrying capacity, which is particularly adapted for carrying heavy loads, and which will run smoothly even on bad roads and cause the least possible wear of the tires.

The two rear axles are connected with each other in such a manner that they can swing relatively to each other in a vertical plane on the longitudinal axis of the frame, but can perform no other movement with regard to each other.

The chassis and the body rest on the rear axles by means of laminated springs, which however are only exposed to stresses in vertical planes parallel to the longitudinal axis of the chassis. The lateral stresses between the rear axles and the rest of the car are taken up by means of supports mounted to swing in a vertical plane, the free ends of which are connected by means of ball bearings or the like with the respective rear axles thereby preventing the middle points of the same from performing movements outside the vertical longitudinal plane of the chassis.

On the drawing:

Figure 1 is a side view of a motor car according to the invention, some parts being removed for the sake of clearness.

Fig. 2 is a plan of the chassis.

Fig. 3 is a detail on a larger scale showing a section on the line III—III on Fig. 2.

The chassis illustrated on the drawing is provided with a front axle 1 and two rear axles 2, 3. The wheels on the foremost rear axle 2 are connected with the steering gear 4, 5 by means of connecting rods 6, 7, 8 and levers 9, 10, 11 in such a manner that the center line of all wheels in any position of the same will meet in one point.

The two pairs of rear wheels are driven from the gear box 12 by means of transmission shaft 13 (not shown on Fig. 2), which is provided with the necessary ball joints and leads through the hollow supporting lever 14 and the differential box 15 of the foremost rear axle to the differential axle 16 for the rearmost axle.

The driving movement is transmitted to the foremost rear wheels by means of universal couplings. Brakes are provided for all rear wheels, said brakes being so compensated relatively to each other by means of compensating levers or the like, that the braking power on the four rear wheels is always equal.

The differential boxes 15, 16 are connected with each other by means of sleeves 17, 18 fastened to each of said boxes. Sleeve 18 fits telescopically into sleeve 17 and can perform a limited rotating movement inside the same, while it is prevented from sliding by means of flange 19 and sleeve nut 20, as shown on Fig. 3. The rear axles 2, 3 in this manner are permitted to perform swinging movements independent of each other about the center line of the two differential boxes.

Stays or rods 21, 22 are provided for steadying the axles with regard to their respective sleeves 17, 18. The stays 22 are connected to the front end of sleeve 18 and pass through slots in sleeve 17 on the upper as well as on the underside of same sleeve. The stays 21 are placed in the middle.

The chassis rests on the axles by means of laminated springs 23, 24, the uppermost of which 23 has its free ends connected to the chassis by means of links 25, while the lower spring 24 is pivotally connected at the middle to spring 23 and connected at both end with axles 2, 3 by means of links 26. In order not to expose said springs to lateral stresses the rear axles are connected to supporting levers 14, 27 which engage each of the differential boxes 15, 16 by means of ball joints 28, 29. The supporting lever 14 is hollow and forms a casing for part of the transmission shaft 13, and the supporting lever 27 is constructed in the form of a telescopic bar, so that it can expand and contract in order to follow the differential box 16 in its movements.

Claims.

1. In a chassis for motor vehicles, a front axle, two rear driving axles, a differential gear connected with each rear axle, gear casings inclosing the gears, and telescoping relatively rotatable sleeves connecting said casings, and means to prevent relative longitudinal movement of said sleeves.

2. In a three-axled chassis or frame for motor driven vehicles a front axle whose wheels are connected in the ordinary manner with the stearing gear and two rear axles, which are both driven from the motor and the foremost of which has its wheels connected with the stearing gear, supporting levers adapted to swing in the longitudinal center plane of the chassis and connected to the middle of each rear axle, said supporting levers taking up all lateral stresses between the chassis and the wheels.

3. In a chassis for motor vehicles, a front axle, two rear driving axles, means for steering the wheels of the front axles and the wheels of the foremost rear axle, differential gearing connected with each rear axle, a motor driven shaft for operating said gearing, casings for said gearings, supporting levers mounted on the chassis and arranged to swing in the longitudinal center plane thereof, and ball and socket connections between the levers and casings.

4. In a chassis for motor vehicles, a front axle, two rear driving axles, means for steering the wheels of the front axle and the wheels of the foremost rear axle, differential gearing connected with each rear axle, a motor driven shaft for operating said gearing, casings for said gearings, telescoping relatively rotatable sleeves connecting the casings, and brace rods connecting the rear axles to the casings.

5. In a chassis for motor vehicles, a front axle, two rear driving axles, means for steering the wheels of the front axle and the wheels of the foremost rear axle, differential gearing connected with each rear axle, a motor driven shaft for operating said gearing, casings for said gearings, telescoping relatively rotatable sleeves connecting the casings, brace rods connecting the rear axles to the casings, a supporting lever mounted on the chassis and arranged to swing in the longitudinal center plane thereof, a ball and socket connection between said lever and the foremost rear gear-casing, and a telescoping supporting lever mounted on the chassis and connected to the rear gear casing.

In testimony that I claim the foregoing as my invention, I have signed my name in presence of two subscribing witnesses.

HANS CLARIN HOVIND MUSTAD.

Witnesses:
C. VARMAN,
C. FABRICIUS HANSEN.